United States Patent
Godwin

(10) Patent No.: US 11,592,582 B2
(45) Date of Patent: Feb. 28, 2023

(54) SYSTEM AND METHOD FOR TRACKING COMPETITIVE DRIVING ON A CIRCUIT

(71) Applicant: Christopher Todd Godwin, Los Angeles, CA (US)

(72) Inventor: Christopher Todd Godwin, Los Angeles, CA (US)

( * ) Notice: Subject to any disclaimer, the term of this patent is extended or adjusted under 35 U.S.C. 154(b) by 209 days.

(21) Appl. No.: 17/169,351

(22) Filed: Feb. 5, 2021

(65) Prior Publication Data

US 2022/0252738 A1 Aug. 11, 2022

(51) Int. Cl.
*G01S 19/51* (2010.01)
*G01S 5/00* (2006.01)
*G08G 1/00* (2006.01)

(52) U.S. Cl.
CPC ............ *G01S 19/51* (2013.01); *G01S 5/0009* (2013.01); *G08G 1/205* (2013.01)

(58) Field of Classification Search
CPC ........ G01S 19/51; G01S 5/0009; G08G 1/205
See application file for complete search history.

*Primary Examiner* — Mathew Franklin Gordon
(74) *Attorney, Agent, or Firm* — Fei Hung Yang

(57) ABSTRACT

A system and method tier tracking competitive driving on a driving circuit provides a unique driving experience for multiple drivers that allows a driving circuit, drivers and their vehicles, and driver statistics to be tracked, recorded, and displayed on a shared network. In some embodiments, the system and method provide a software application that enables multiple drivers to simultaneously drive on the same driving circuit, and on the same network. The driving circuit is a real public roadway that is digitally displayed, along with the position of each driver. The driving circuit is defined by a starting point and an ending point, and the position of the drivers is also visible on the driving circuit. Further, multiple driver statistics are recorded and displayed on the network for all to see.

7 Claims, 3 Drawing Sheets

400

| PHANTOM GRID 402 | |
|---|---|
|  | 404 NAME _____ <br> 406 (POINTS) _____ <br> 408 (VEHICLE TYPE/COLOR) _____ <br> CLASS:D LICENSE#:00000000000 SEX:N/A DOB:N/A EYES:N/A  |

SYSTEM AND METHOD FOR TRACKING COMPETITIVE DRIVING ON A CIRCUIT

CROSS-REFERENCE TO RELATED APPLICATIONS

This non-provisional application claims priority under 35 U.S.C. § 119(a) on U.S. Provisional Patent Application No. 62/971,474 filed on Feb. 7, 2020, the entire contents of which are hereby incorporated by reference.

FIELD OF THE INVENTION

The present invention relates generally to a system and method for tracking competitive driving on a driving circuit. More so, a system and method provides a software application that enables multiple drivers to simultaneously drive on the same driving circuit, and on the same network, while being tracked and monitoring each other in real time; whereby the driving circuit is a real roadway that is digitally displayed along with the position of each driver on the communication device of the drivers, and the driving circuit is also defined by a starting point and an ending point; and whereby driver statistics are recorded and displayed on the network for all to see.

BACKGROUND OF THE INVENTION

The technology of tracking vehicle driving and driving circuits thereof has been developing since a long time ago. A bunch of applications installed or directed to mobile devices can perform the navigation or tracking for the majority of normal vehicle driving. Over these years, auto racing or competitive driving has emerged into a popular sport industry in several different forms, which has brought about the related technology for competitive driving including tracking and recording technology. The existing arts has included some research on the tracking competitive driving and the circuits.

The best-known use of vehicle tracking system or method generally integrates a GPS (Global Position System) navigation system with specific hardware and software. For example, a user installs a mobile unit on his race vehicle which features software allowing a processor connected to the electronics of the user's vehicle to communicate with an inertial navigation system which collects racing information, with a remote database which features software for various interactive real-time or virtual GPS racing system and processing the driving information of all users, and with a GPS in real time. The mobile unit collects, processes, saves, and transmits user-specific racing information continuously throughout the game. Some advanced systems contain more sophisticated features, where some database processes and evaluates the received. driving information, offsets this information with the users' basic input data, and compares the information of all users.

A general GPS only enables users to track their own circuits when they are involving in a single driving event. In a real auto racing or competitive driving game, it is difficult for a system for users or viewers to identify the vehicles, determine how many circuits a particular vehicle can choose, the identification information of the cars and drivers, and the instantaneous velocity/location/direction of a car. Additionally, because the driving is high speedy and competitive, the track system needs to identify whether every driving is a delay or on time, how other competitors drive in real time, and the information of other competitors. Thus, current racing events and competitive driving events have presented some challenges in developing an all-round, intelligent, and instant-feedback system or method to navigate the vehicle.

Thus, there is a need for enhancing the system or method for tracking competitive driving on a circuit.

SUMMARY OF THE INVENTION

The invention provides a system and method for tracking competitive driving on a circuit for the users or drivers when they are participating in a competitive event or game. Said system and method for tracking competitive driving on a driving circuit provides a unique driving experience for multiple drivers that allows a driving circuit, drivers and their vehicles, and driver statistics to be tracked, recorded, and displayed on a shared network. It is an objective of the present invention to solve the problems and flaws in the prior art, in which the users or drivers in a competitive race can't view other drivers' positions and information in the competitive event.

In one embodiment, A method for tracking competitive driving on a driving circuit, the method comprising: selecting a driving circuit for competitive driving, the driving circuit comprising a real roadway; identifying, by an administrator, a starting position and an ending position on the driving circuit; connecting multiple drivers on a network, the network operable to digitally display the driving circuit and the position of the drivers on the driving circuit; viewing, by the drivers through multiple communication devices, the driving circuit; driving, by the drivers on the circuit; tracking the position of the drivers on the driving circuit; displaying, on the network, the position of the drivers relative to the starting point and the ending point of the driving circuit; generating, by the drivers, driver statistics, the driver statistics including at least one of the following: speed, time, relative position, and delays by the drivers; and displaying the driver statistics on the communication devices of the drivers.

In another aspect of the embodiments, the driving circuit comprises a real public roadway.

In another aspect of the embodiments, wherein the drivers are tracked through GPS.

In another aspect of the embodiments, wherein the network is accessible through a software application.

In another aspect of the embodiments, wherein the communication device comprises a smart phone.

In another aspect of the embodiments, wherein the driver statistics generate points for completing the circuit and having the shortest period of time amongst the drivers.

In another embodiment, the invention provides a system for tracking competitive driving on a circuit, the system executes one of methods above optionally.

In another embodiment, the system and method provide a software application that enables multiple drivers to simultaneously drive on the same driving circuit, and on the same network. The driving circuit is a real public roadway that is digitally displayed, along with the position of each driver. The driving circuit is defined by a starting point and an ending point, and the position of the drivers is also visible on the driving circuit. Further, multiple driver statistics are recorded and displayed on the network for all to see.

The system and method of operation of the embodiments disclosed herein, however, together with additional objectives and advantages thereof, will be best understood from the following description of specific, exemplary embodiments when read in connection with the accompanying drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
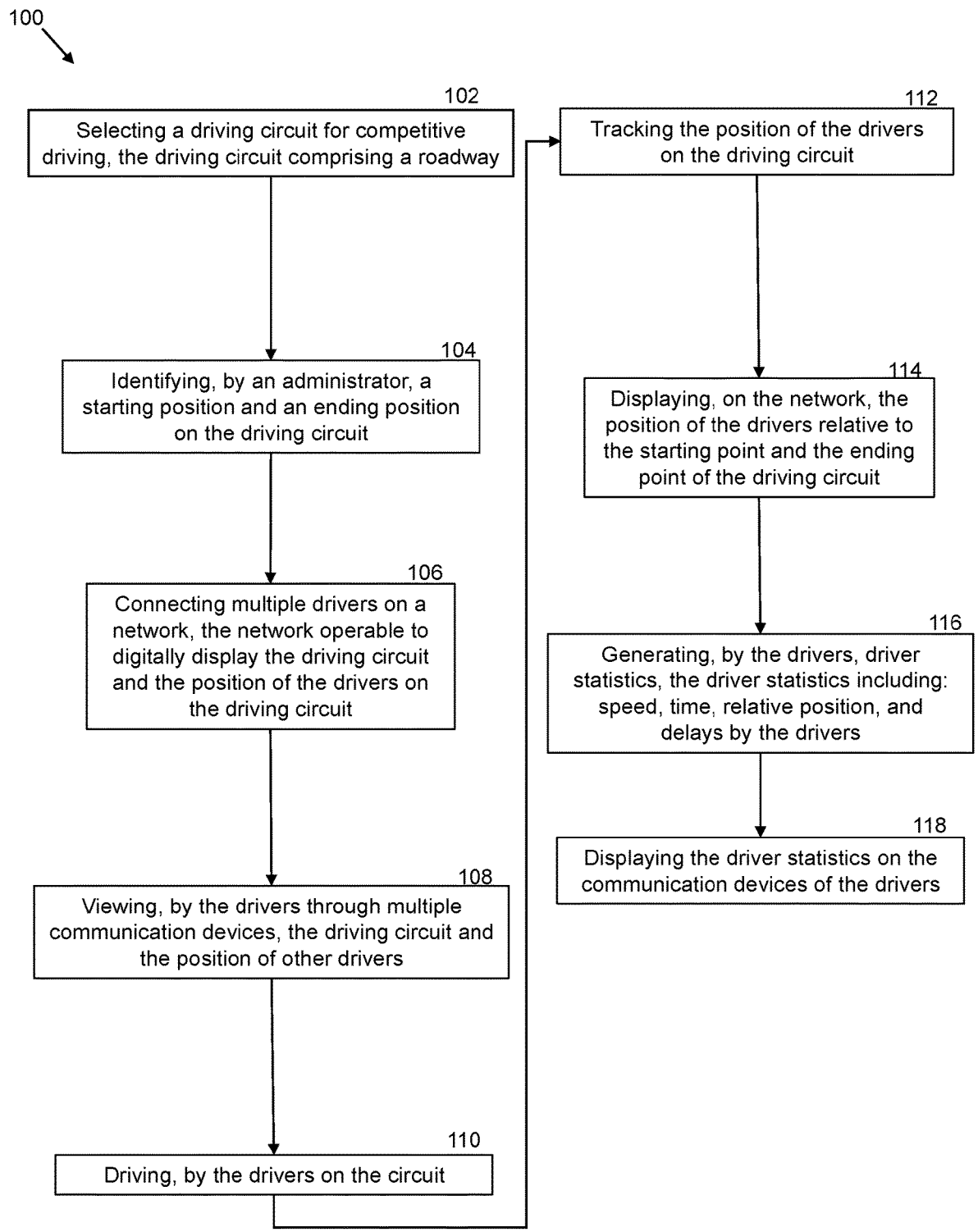
FIG. 1 illustrates a flowchart diagram of an exemplary method for tracking competitive driving on a driving circuit, in accordance with an embodiment of the present invention.
Figure 2:
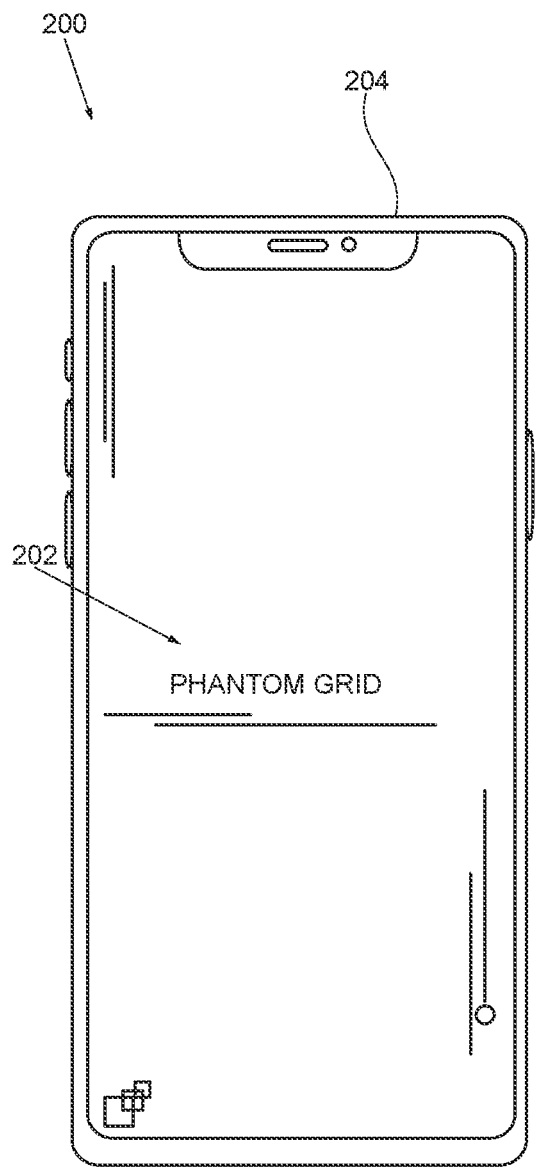
FIG. 2 illustrates a top view of a communication device with the software application for the system for tracking competitive driving on a driving circuit, in accordance with an embodiment of the present invention.
Figure 3:
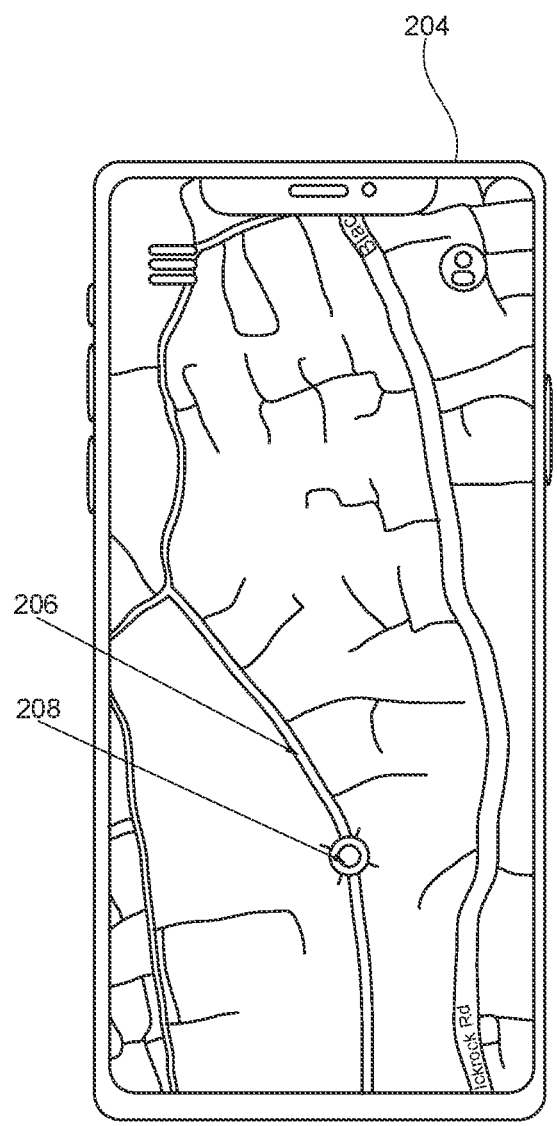
FIG. 3 illustrates a top view of a communication device with the software application, showing the driver on the driving circuit, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims, Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIG. 1-4, a system 200 and method 100 for tracking competitive driving on a driving circuit 206 provides a unique driving experience for multiple drivers 208 that allows a driving circuit 206, drivers 208 and their vehicles, and driver statistics to be tracked, recorded, and displayed on a shared network 202. In some embodiments, the system and method 100 provide a software application that enables multiple drivers 208 to simultaneously drive on the same driving circuit 206, and on the same network 202, while being tracked and monitoring each other in real time. The driving circuit 206 is a real roadway that is digitally displayed, along with the position of each driver, on the communication device 204 of the drivers 208. The driving circuit 206 is defined by a starting point and an ending point, and the position of the drivers 208 is also visible on the driving circuit 206. Further, multiple driver statistics are recorded and displayed on the network 202 for all to see. In essence, the system 200 allows different drivers 208 that do not know each other to competitively drive against each other on a public road.

One aspect of a method 100 for tracking competitive driving on a driving circuit, comprises:
selecting a driving circuit 206 for competitive driving, the driving circuit 206 comprising a real roadway;
identifying, by an administrator, a starting position and an ending position on the driving circuit 206;
connecting multiple drivers 208 on a network 202, the network operable to digitally display the driving circuit 206 and the position of the drivers 208 on the driving circuit 206;
viewing, by the drivers 208 through multiple communication devices 204, the driving circuit 206;
driving, by the drivers 208 on the driving circuit 206;
tracking the position of the drivers 208 on the driving circuit 206;
displaying, on the network 202, the position of the drivers 208 relative to the starting point and the ending point of the driving circuit 206;
generating, by the drivers 208, driver statistics, the driver statistics including at least one of the following: speed, time, relative position, and delays by the drivers 208; and
displaying the driver statistics on the communication devices 204 of the drivers 208.

In another aspect, the driving circuit 206 comprises a real public roadway.

In another aspect, the drivers 208 are tracked through GPS.

In another aspect, the network is accessible through a software application.

In another aspect, the communication device 204 comprises a smart phone.

In another aspect, the driver statistics generate points for completing the circuit and having the shortest period of time amongst the drivers 208.

One objective of the present invention is to provide a virtual driving experience for multiple drivers 208 on a real public roadway.

Another objective is to allow various drivers 208 to join a network, and drive on the same roadway simultaneously, through the software application.

Another objective is to minimize risks of being pulled over by law enforcement for competitive driving on public roadways, Another objective is to enable advertisers to market on the software application, visible on the communication devices 204.

FIG. 1 references the method 100 for tracking competitive driving on a driving circuit 206 allows multiple drivers 208 to drive on the same driving circuit 206 while being tracked, and having driver statistics recorded and displayed. The method 100 may include an initial Step 102 of selecting a driving circuit 206 for competitive driving, the driving circuit 206 comprising a real roadway. In some embodiments, the driving circuit 206 comprises a real public roadway, including an interstate or local highway. In alternative embodiments, the driving circuit 206 may also include a track. This may also include stretches of established public roads.

The method 100 may further comprise a Step 104 of identifying, by an administrator, a starting position and an ending position on the driving circuit 206. The starting and ending positions on the driving circuit 206 are arbitrarily selected and may be changed. A Step 106 includes connecting multiple drivers 208 on a network 202, the network operable to digitally display the driving circuit 206 and the position of the drivers 208 on the driving circuit 206. In one embodiment, the network 202 is accessible through a software application. The software application may be downloaded by the drivers 208 through their communication devices 204.

In some embodiments, a Step 108 comprises viewing, by the drivers 208 through multiple communication devices 204, the driving circuit 206. A Step 110 includes driving, by the drivers 208 on the driving circuit 206. In some embodiments, a Step 112 may include tracking the position of the drivers 208 on the driving circuit 206. In one embodiment, the drivers 208 are tracked through GPS, or other tracking systems known in the art. The different driving circuits 206 are displayed on a GPS map that overlays on driver's communication devices 204 that corresponds to real-world roads. A Step 114 comprises displaying, on the network, the position of the drivers 208 relative to the starting point and the ending point of the driving circuit 206.

Figure 4:
FIG. 4 illustrates a top view of an exemplary user profile license, showing the identification of a driver on the driving circuit, in accordance with an embodiment of the present invention.
Figure 4:
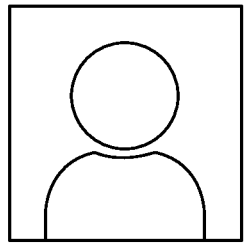
Figure 4:

The drivers may include any member of the public, or professional drivers that belong to a driving league or association. The drivers 208 have a unique profile (license) displaying a picture of their choosing, car they drive, and a point total they have accrued driving on past driving circuits 206. For example, FIG. 4 illustrates an exemplary user profile license 400, showing the identification of a driver on the driving circuit. Vital identification, such as a photograph 402 of the driver; the name 404 of the driver; the number of points 406 accumulated by the driver; and the vehicle 408 type and color of the driver display from the user profile license 400. The user profile license 400 can be useful as an entry ticket for events and get-togethers held for the drivers in the network, and also for helping the driver record points accumulated when driving multiple circuits.

The method 100 may further comprise a Step 116 of generating, by the drivers 208, driver statistics, the driver statistics including at least one of the following: speed, time, relative position, and delays by the drivers 208. For example, the speed of the drivers 208 is recorded and compared with other drivers 208; or the amount of first place finishes to the end point of driving circuits 206 is recorded. In some embodiments, the driver statistics generate points for completing the circuit and having the shortest period of time amongst the drivers 208. A final Step 118 includes displaying the driver statistics on the communication devices 204 of the drivers 208. This real time display of the driver statistics creates an instant analysis of the competitive drive throughout the virtual community.

In yet another embodiment of the system 200, a mobile software application designed to track the communication devices of the drivers while maneuvering the driving circuit. The different driving circuits are displayed on a GPS map that overlays on driver's communication devices that corresponds to real-world roads. Upon entering a circuit, a virtual timer within the application will begin counting up, stopping once the circuit has been completed or abandoned.

Continuing, the circuit completion times are uploaded and saved within the network to leaderboards corresponding to the circuit that is completed. The drivers are awarded a set amount of points for each completion of a circuit and additional points will be earned by achieving a time that would land the driver on or near the top of the leaderboards. Each driver has a unique profile (license) displaying a picture of their choosing, car(s) they own/drive, and a point total they have accrued driving on circuits. The drivers may also create and join virtual communities in the network 202, unlocking additional features within a designated area in the software application.

In another embodiment, the invention provides a system for tracking competitive driving on a circuit, the system executes methods described above optionally.

Although the process-flow diagrams show a specific order of executing the process steps, the order of executing the steps may be changed relative to the order shown in certain embodiments. Also, two or more blocks shown in succession may be executed concurrently or with partial concurrence in some embodiments, Certain steps may also be omitted from the process-flow diagrams for the sake of brevity. In some embodiments, some or all the process steps shown in the process-flow diagrams can be combined into a single process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method for tracking competitive driving on a driving circuit, the method comprising:
    selecting a driving circuit for competitive driving, the driving circuit comprising a real roadway;
    identifying, by an administrator, a starting position and an ending position on the driving circuit;
    connecting multiple drivers on a network, the network operable to digitally display the driving circuit and the position of the drivers on the driving circuit;
    viewing, by the drivers through multiple communication devices, the driving circuit;
    driving, by the drivers on the circuit;
    tracking the position of the drivers on the driving circuit;
    displaying, on the network, the position of the drivers relative to the starting point and the ending point of the driving circuit;
    generating, by the drivers, driver statistics, the driver statistics including at least one of the following: speed, time, relative position, and delays by the drivers; and
    displaying the driver statistics on the communication devices of the drivers.

2. The method of claim 1, wherein the driving circuit comprises a real public roadway.

3. The method of claim 1, wherein the drivers are tracked through GPS.

4. The method of claim 1, wherein the network is accessible through a software application.

5. The method of claim 1, wherein the communication device comprises a smart phone.

6. The method of claim 1, wherein the driver statistics generate points for completing the circuit and having the shortest period of time amongst the drivers.

7. A system for tracking competitive driving on a circuit, the system executing one method of claims 1-6.

* * * * *